United States Patent
Henocq et al.

(10) Patent No.: US 8,792,548 B2
(45) Date of Patent: Jul. 29, 2014

(54) METHOD OF TRANSMITTING A PRE-CODED VIDEO SIGNAL OVER A COMMUNICATION NETWORK

(75) Inventors: Xavier Henocq, Melesse (FR); Patrice Onno, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 12/400,745

(22) Filed: Mar. 9, 2009

(65) Prior Publication Data

US 2009/0232200 A1   Sep. 17, 2009

(30) Foreign Application Priority Data

Mar. 11, 2008 (FR) ..................... 08 01320

(51) Int. Cl.
*H04N 7/12* (2006.01)
(52) U.S. Cl.
USPC .................................... 375/240.01
(58) Field of Classification Search
USPC .......................... 375/240.01, 240.1
IPC ................................. H04N 11/02
See application file for complete search history.

(56) References Cited

U.S. PATENT DOCUMENTS

| | | | |
|---|---|---|---|
| 6,392,705 B1 * | 5/2002 | Chaddha | 348/388.1 |
| 6,937,769 B2 | 8/2005 | Onno | |
| 7,095,782 B1 * | 8/2006 | Cohen et al. | 375/240.01 |
| 7,237,032 B2 | 6/2007 | Gemmell | |
| 2005/0117641 A1 | 6/2005 | Xu et al. | |
| 2006/0095943 A1 * | 5/2006 | Demircin et al. | 725/81 |
| 2007/0230566 A1 | 10/2007 | Eleftheriadis et al. | |
| 2008/0232240 A1 * | 9/2008 | Baum et al. | 370/210 |
| 2009/0138773 A1 | 5/2009 | Henocq et al. | |

OTHER PUBLICATIONS

French Preliminary Search report dated Dec. 9, 2008 in corresponding French Application No. 0801320.

Floyd S et al: "Equation-Based Congestion Control for Unicast Applications" Computer Communication Review, vol. 30, No. 4, Oct. 1, 2000, pp. 43-56, XP001063485 ACM, New York, NY, US ISSN: 0146-4833.

U.S. Appl. No. 12/477,008, filed on Jun. 2, 2009.

* cited by examiner

*Primary Examiner* — Dave Czekaj
*Assistant Examiner* — Tracy Li
(74) *Attorney, Agent, or Firm* — Fitzpatrick, Cella, Harper & Scinto

(57) ABSTRACT

A video signal pre-coded using hierarchical coding is transmitted over a communication network, the signal being constituted by data distributed into several hierarchical levels. More specifically, a bandwidth of the communication network is periodically estimated over evaluation periods. A set of hierarchical levels is selected for a current evaluation period, where a transmission rate of the data of the selected hierarchical levels is compatible with the bandwidth estimated for a current evaluation period. A change tendency of the bandwidth is estimated for a following evaluation period. Additional data of the video signal to transmit is then determined depending on the estimated change tendency of the bandwidth, and the data of the selected hierarchical levels and the determined additional data is transmitted during the current evaluation period.

21 Claims, 7 Drawing Sheets

METHOD OF TRANSMITTING A PRE-CODED VIDEO SIGNAL OVER A COMMUNICATION NETWORK

The present invention concerns a method of transmitting a pre-coded video signal over a communication network.

In a complementary manner, it also concerns a device for transmitting a pre-coded video signal over a communication network.

The present invention generally concerns the field of the continuous transmission of video over a communication network between a server and a client.

It relates in particular to the problem of the variable conditions for transmission of the video data due, in particular, to the variations in bandwidth available over that network.

More particularly it concerns the transmission of a video signal pre-coded using hierarchical coding, in which the video signal is constituted by data distributed into several hierarchical levels.

This type of coding is in particular implemented by the SVC standard (SVC being an acronym for "Scalable Video Coding").

The SVC standard makes it possible to increase the hierarchization of the coding developed in accordance with the H.264 standard.

In particular, the hierarchization axes may be spatial, temporal or of quality levels.

Hierarchization in terms of quality (i.e. SNR or "Signal to Noise Ratio") consists of increasing the signal to noise ratio of a coding level.

Several concepts are provided for hierarchy of quality levels: CGS or "Coarse Grain Scalability", MGS or "Medium Grain Scalability" and FGS or "Fine Grain Scalability".

CGS hierarchical coding uses the same concepts as coding with spatial hierarchy.

Each CGS hierarchical level thus improves a given spatial level.

FGS hierarchical coding enables a data stream to be obtained which may be truncated at any point without preventing the decoding process from progressing.

This feature is particularly desirable for precisely adapting the rate of video data to transmit.

MGS hierarchical coding is an intermediate coding providing finer decoding that CGS hierarchical coding but without however enabling the data stream to be truncated at any point without adversely affecting the decoding.

Thus, apart from FGS hierarchical decoding, there is no continuity in the data stream between two successive hierarchical levels of a coded image. In other words, it is necessary to transmit the entirety of a CGS or MGS hierarchical level to enable decoding of the data at a higher quality level.

The present invention aims to improve the transmission of a video signal pre-coded in accordance with the SVC standard comprising CGS hierarchical levels, or even MGS hierarchical levels.

The implementation of coding according to the SVC standard necessitates the use of a decision engine situated on a server, adapted to select an optimal set of hierarchical levels to transmit on the basis of the conditions of the communication network.

In particular, the decision engine takes into account information specific to the network (available bandwidth, rate of loss), or relative to the client (decoding and computing capacity, screen size), to the server (status of the buffer memories) or to the information representing data and for example the characteristics and the content of the video data requested by the client.

The decision engine combines this information to determine the best means for transmitting the pre-coded video signal.

In particular, the decision engine regularly receives information on the bandwidth of the network and information representing the rate of the hierarchical levels constituting the video signal to transmit.

Each sub-set of data distributed into several hierarchical levels is compared with the available bandwidth in order to select a set of hierarchical levels of which the transmission rate is as compatible as possible with the available bandwidth.

However, the difference between the cumulative rate of the selected sub-sets of data and the available bandwidth may be great.

In the best case, this bandwidth residue is lost for the transmission of the pre-coded video signal; in the worst case, this bandwidth resource may be used by a competing application.

In order to avoid this last situation occurring, the document US 2007/0230566 describes a system in which the server transmits in entirety the lowest hierarchical levels and at least one portion of a higher hierarchical level in order to occupy the whole of the available bandwidth.

However, depending on the portion of higher hierarchical level transmitted, the decoder may not succeed in using that data portion on decoding.

This solution amounts to the case in which losses in the upper layers of data are found by the decoder.

If, at the decoder, the error checking processes are sufficiently effective, those data may be retrieved; otherwise, those data are unused.

Thus, this prior solution avoids competing applications occupying the bandwidth residue but does not ensure that the additional data transmitted in part will be sufficient to improve the decoding of the transmitted video signal.

A different solution is also known from a document U.S. Pat. No. 7,237,032 which consists of sequentially transmitting the hierarchical levels constituting a video signal.

Thus, if the available bandwidth of the communication network is not sufficient, the data of a first hierarchical level are transmitted, then, in a second phase, the data of a higher hierarchical level are transmitted.

However, this solution is not adapted to continuous and real-time transmission of a pre-coded video signal over a communication network.

The present invention aims to solve the aforesaid drawbacks and to provide a transmission method enabling the available bandwidth to be fully used while transmitting as much as possible of the data that are useful for the decoding of the transmitted video signal.

According to a first aspect the present invention is directed to a transmission method for transmitting, over a communication network, a video signal pre-coded using hierarchical coding, the signal being constituted by data distributed into several hierarchical levels, comprising the following steps.

periodically estimating the bandwidth of the communication network over evaluation periods; and for a current evaluation period, selecting a set of hierarchical levels, the transmission rate of the data of the selected hierarchical levels being compatible with the bandwidth estimated for the current evaluation period.

According to the invention, the transmission method further comprises the following steps:

estimating a change tendency of the bandwidth for a following evaluation period;

determining additional data of the video signal to transmit depending on the estimated change tendency of the bandwidth; and transmitting the data of the selected hierarchical levels and the determined additional data during the current evaluation period.

The transmission method in accordance with the invention thus makes it possible to determine additional data to transmit during a current evaluation period on the basis of the change tendency of the bandwidth of the communication network.

This transmission method thus makes it possible to occupy the whole of the available band of the communication network to transmit the pre-coded video signal while permitting the selection of additional data useful for the decoding, for the improvement thereof.

According to an advantageous feature of the invention, at the step of determining additional data, those additional data are chosen from among data of said current evaluation period or data of said following evaluation period.

Thus, the method of transmission makes it possible to select the evaluation period to which the bandwidth residue will be dedicated on the basis in particular of the change tendency of that bandwidth.

Thus, precedence may be given to the transfer of additional data which cannot be entirely transmitted in the current evaluation period or on the contrary to the transfer of additional data which are liable not to be entirely transmitted in the following evaluation period.

Thus, the transmission method in accordance with the invention makes it possible to mitigate the effects of variations in bandwidth on the quality of the video signal transmitted and decoded, as perceived by the user at the client device of the communication network.

In practice, at said step of determining additional data, if said bandwidth for the following evaluation period has a tendency to increase, the additional data are chosen in at least one hierarchical level higher than said set of hierarchical levels selected for said current evaluation period.

On the contrary, if said bandwidth for the following evaluation period has a tendency to decrease, the additional data are chosen from among at least one hierarchical level of said following evaluation period, that hierarchical level being identical to a hierarchical level of said set of hierarchical levels selected for said current evaluation period.

Thus, rather than optimizing the quality of the video signal to decode for each evaluation period, an average decoding quality over time is maintained.

Thus, the effects of variations in bandwidth on the result of the decoding are mitigated, avoiding the user from perceiving variations in quality during the continuous decoding of the video signal.

According to an advantageous feature, at the step of determining additional data, the additional data are determined furthermore on the basis of a bandwidth residue calculated on the basis of difference between the current bandwidth and the transmission rate of the data of the selected hierarchical levels.

According to a feature of the invention, the transmitting step comprises the following sub-steps:

sending the data of said set of hierarchical levels selected for said current evaluation period;

searching for data not transmitted during an evaluation period preceding said current evaluation period; and transmitting said data not transmitted at said preceding evaluation period, then said determined additional data.

The transmission method thus makes it possible to smooth the transmission of the additional data over time and to entirely transmit a selected hierarchical level, such that the transmitted data are actually usable for the decoding of the video signal.

In practice, at the step of estimating a change tendency, said tendency is evaluated on the basis of the bandwidths estimated for at least one preceding evaluation period prior to said current evaluation period.

Thus, by observing the past behavior of the bandwidth, it is possible to predict a change tendency of the bandwidth.

In practice, at said step of estimating a change tendency, said bandwidth estimated for the current evaluation period is compared with an average value of the bandwidths estimated for preceding evaluation periods, said bandwidth for a following evaluation period tending to increase when said estimated current bandwidth is less than said average value of the bandwidths, and said bandwidth for a following evaluation period tending to decrease when the estimated current bandwidth is greater than said average value of the bandwidths.

It is thus considered that the current bandwidth is abnormally high or abnormally low relative to the average value such that the bandwidth for the following evaluation period ought to correct that value.

In order to improve the transmission of the pre-coded video signal, at the step of selecting a set of hierarchical levels, said set is selected such that the transmission rate of the data of said selected hierarchical levels is the closest possible to the current bandwidth.

In practice, the transmission method applies to the real-time transmission of a pre-coded video signal between a server and a client of the communication network.

It is desirable in particular when the pre-coded video signal is a signal coded in accordance with the SVC standard with CGS hierarchical levels, those hierarchical levels not lending themselves to the dividing up of the data and requiring to be transmitted in entirety to enable the decoding of the video signal at a higher level of quality.

In a complementary manner, the present invention concerns a transmission device for transmitting, over a communication network, a video signal pre-coded using hierarchical coding, the signal being constituted by data distributed into several hierarchical levels, comprising:

unit configured to periodically estimate the bandwidth of the communication network over evaluation periods; and for a current evaluation period, unit configured to select a set of hierarchical levels, the transmission rate of the data of said selected hierarchical levels being compatible with the bandwidth estimated for said current evaluation period.

According to the invention, the transmission device further comprises:

unit configured to estimate a change tendency of said bandwidth for a following evaluation period;

unit configured to determine additional data of said video signal to transmit depending on said estimated change tendency of the bandwidth; and unit configured to transmit the data of the selected hierarchical levels and the determined additional data during said current evaluation period.

This transmission device has features and advantages similar to those of the transmission method described previously.

According to another aspect, the present invention aims to protect a server of a communication network adapted to transmit a video signal pre-coded with hierarchical coding, comprising means adapted to implement the transmission method in accordance with the invention.

This server has similar features and advantages to those described previously in relation to the transmission method in accordance with the invention.

Lastly, the present invention concerns a computer program that can be loaded into a computer system, the program comprising instructions enabling the implementation of the transmission method in accordance with the invention, when that program is loaded and executed by a computer system.

Still other particularities and advantages of the invention will appear in the following description.

In the accompanying drawings, given by way of non-limiting example:

A description will be given first of all with reference to FIG. 1 of the representation of a video signal coded in accordance with hierarchical coding, this signal being constituted by data distributed into several hierarchical levels.

In this embodiment, the video signal is coded according to the SVC standard with CGS hierarchical levels.

Of course, other types of hierarchical coding could be used on a video signal to transmit according to the transmission method described below.

Figure 1:
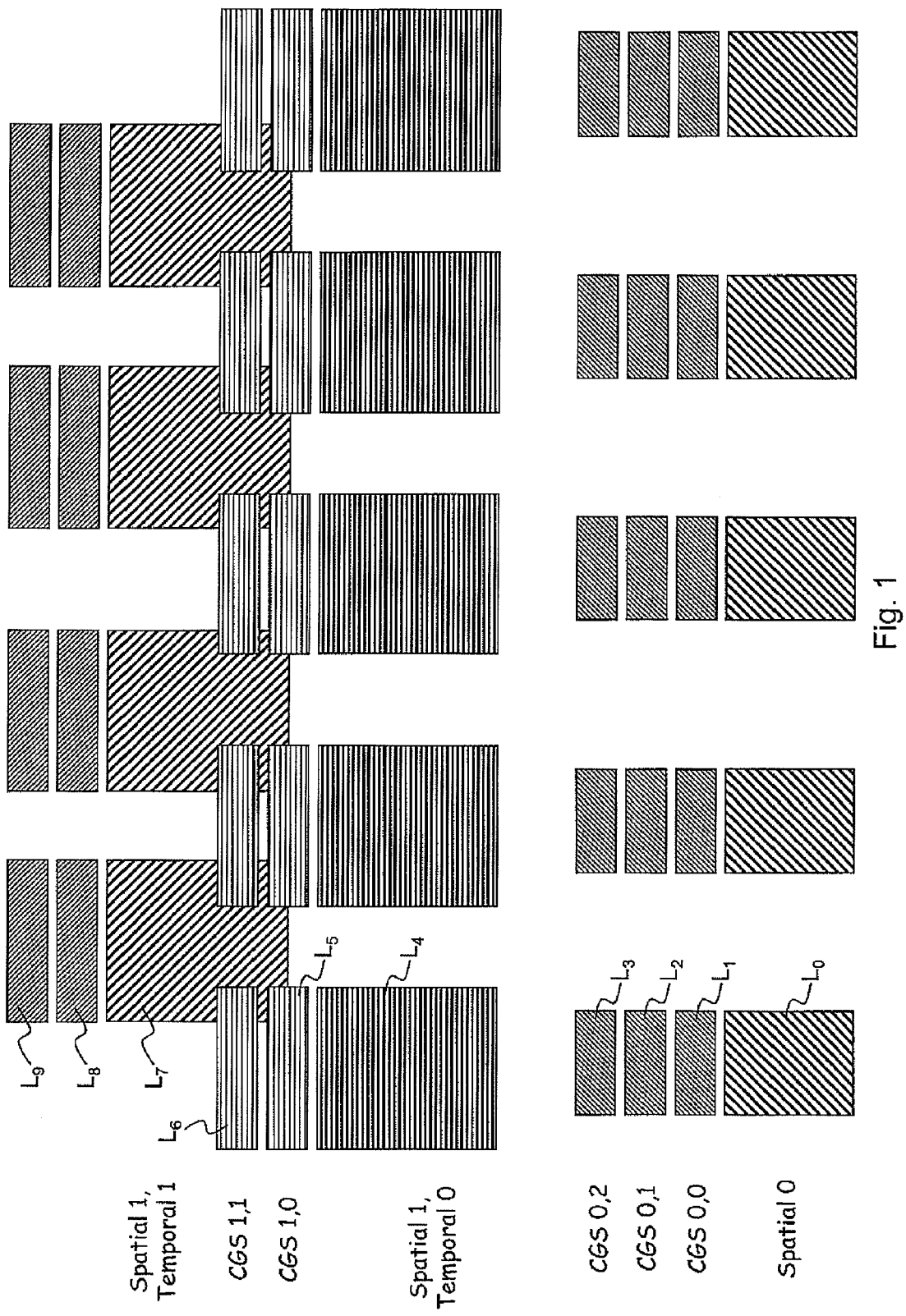
FIG. 1 is a diagram representing a video data stream precoded according to the SVC standard.

In this embodiment, the video data stream is illustrated in FIG. 1 and distributed into several hierarchical levels or coding layers.

By virtue of the use of a SVC standard, the video content of the image is ranked, that is to say that the content is coded into different hierarchical levels thus presenting different rates with different levels of quality.

In this embodiment, the video signal is broken down into two spatial levels (spatial 0 and spatial 1).

The first spatial level is improved by three levels of quality, thus constituting three additional CGS (or Coarse Grain Scalability) hierarchical levels, which are referenced in FIG. 1 CGS 0,0, CGS 0,1 and CGS 0,2.

Similarly, the second spatial level is improved by two additional hierarchical levels CGS 1,0 and CGS 1,1.

Furthermore, this second spatial level (Spatial 1) is improved by a temporal layer.

The video data stream is thus coded by successive image in accordance with the same hierarchical coding scheme.

In the following portion of the description, the successive hierarchical levels for an image will be referenced $L_i$, i varying from 0 to 9 in the embodiment illustrated in FIG. 1.

Thus, the hierarchical level $L_0$ corresponds to the base spatial layer Spatial 0.

The hierarchical levels $L_1$, $L_2$ and $L_3$ respectively correspond to the three quality layers CGS 0,0, CGS 0,1 and CGS 0,2.

The hierarchical level $L_4$ corresponds to the second spatial level, Spatial 1 and to the first temporal level, Temporal 0.

The layers $L_5$ and $L_6$ respectively correspond to the quality levels CGS 1, 0 and CGS 1, 1.

Lastly, the hierarchical layer $L_7$ corresponds to the level Spatial 1 and to the second temporal level Temporal 1.

The levels $L_8$ and $L_9$ respectively correspond to the higher quality levels for the level Spatial 1 of second temporal level Temporal 1.

Figure 2:
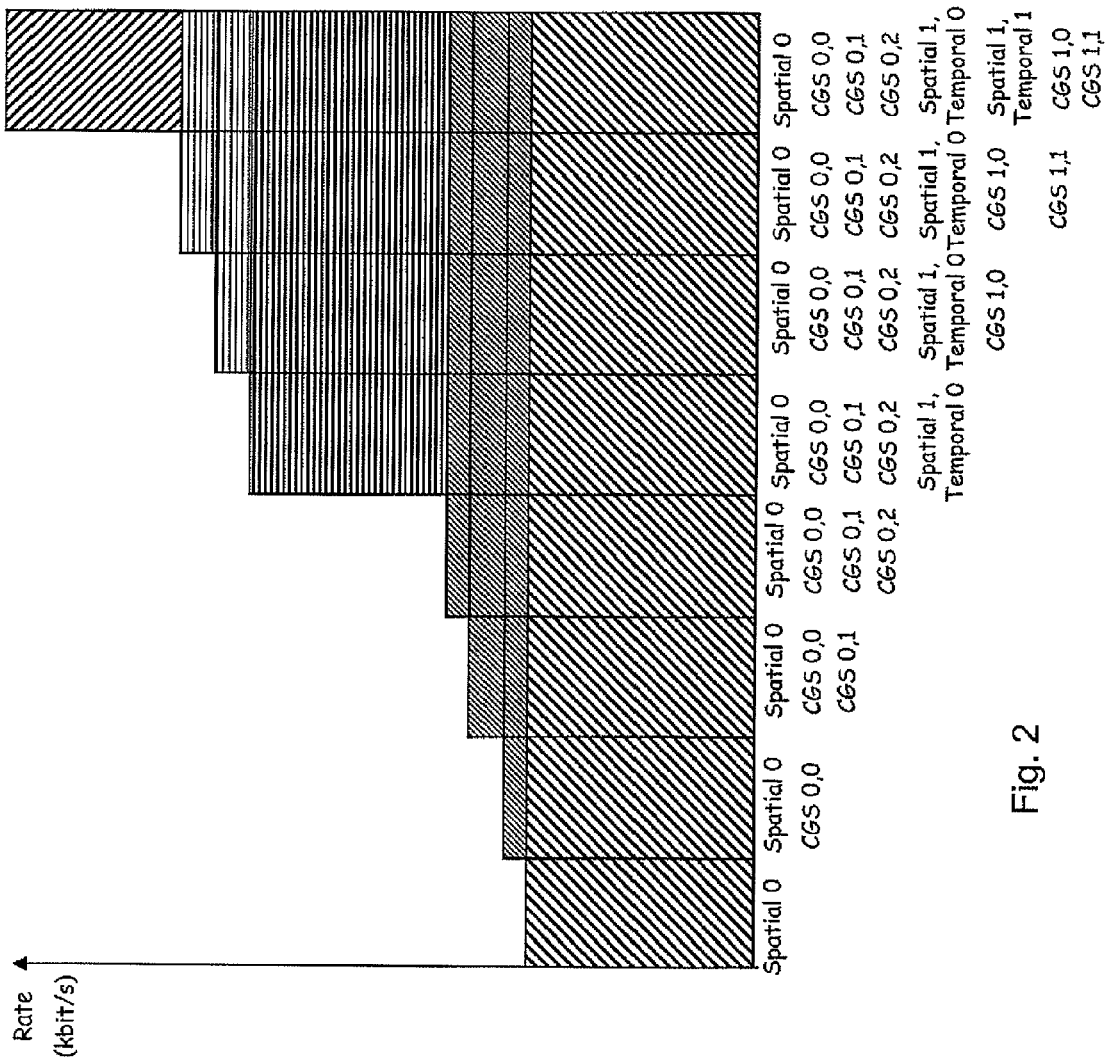
FIG. 2 is a curve illustrating the rate associated with each hierarchical level of a signal such as illustrated in FIG. 1.

In FIG. 2 the cumulative rate has been illustrated for these hierarchical levels.

Thus, the rate associated with the transmission of the video data varies depending on the subset of hierarchical levels transmitted.

This transmitted video data rate must therefore adapt itself to the bandwidth BW available on the communication network.

Figure 3:
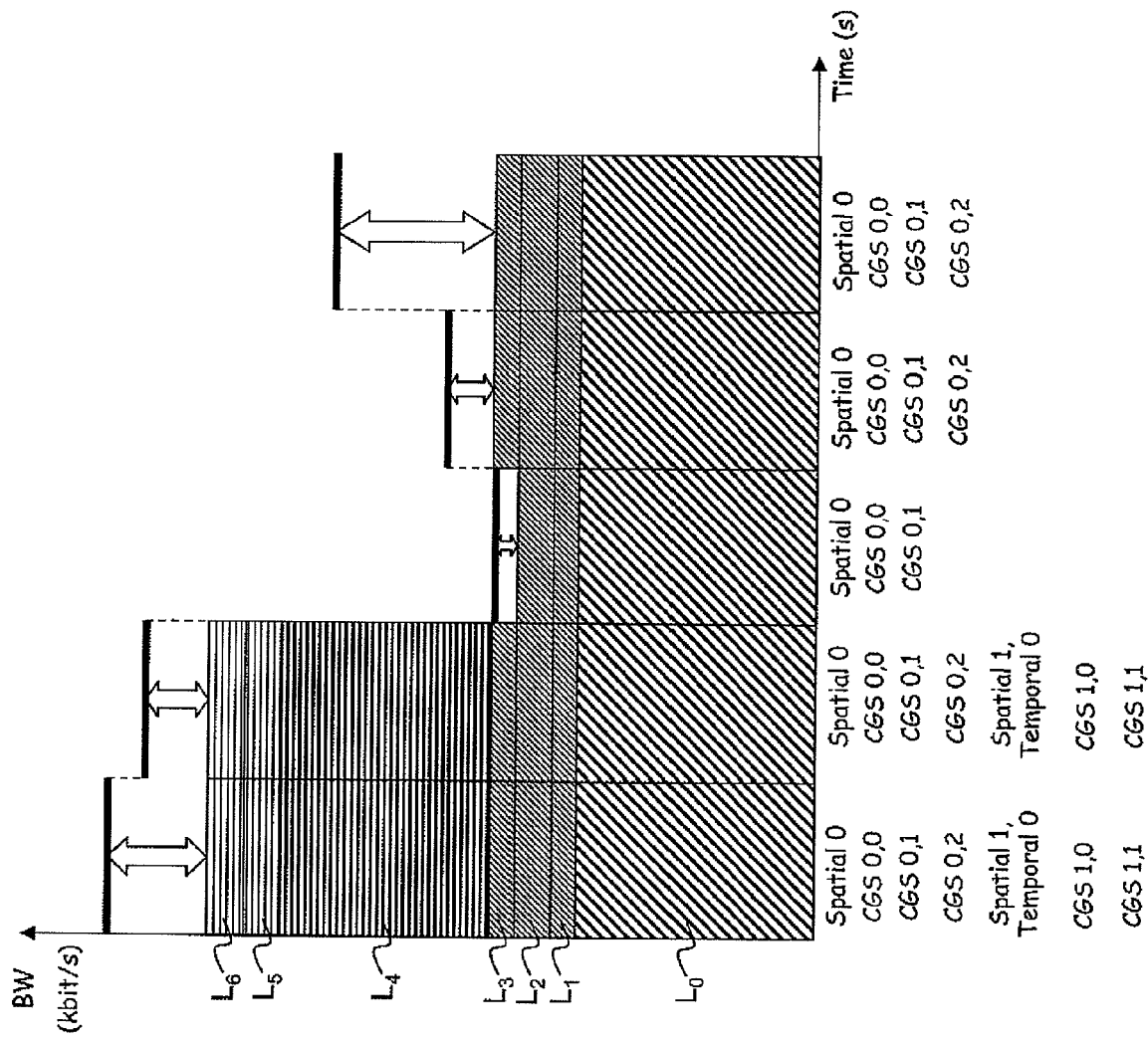
FIG. 3 is a graph illustrating the selection of a set of hierarchical levels compatible with an estimated bandwidth.

Thus, in FIG. 3, the bandwidth BW available over time on a communication network has been illustrated in thick lines.

This bandwidth is evaluated periodically, and for example over evaluation periods of between 30 and 300 ms.

The bandwidth varies over time, in particular depending on the occupation of the communication network.

FIG. 3 illustrates, for a conventional decision engine, the selection of a set of hierarchical levels compatible, at each evaluation period, with the available bandwidth.

Thus, depending on the value of that bandwidth BW, the number of hierarchical levels able to be transmitted varies over time.

On reception of the transmitted video signal and after decoding, the level of quality of the decoded image varies strongly depending on the bandwidth available over each evaluation period.

This variation in the level of quality over time is detrimental to what the user perceives.

This is because the variation in the level of quality in a decoded image signal is disappointing and generally less well tolerated by the user than the reception and viewing of a decoded signal of lesser quality, but which is constant over time.

It is furthermore to be noted that, as illustrated by the arrows in FIG. 3, at no time does the cumulative rate of the set of the transmitted hierarchical levels reach the available bandwidth BW for each evaluation period.

Figure 4:
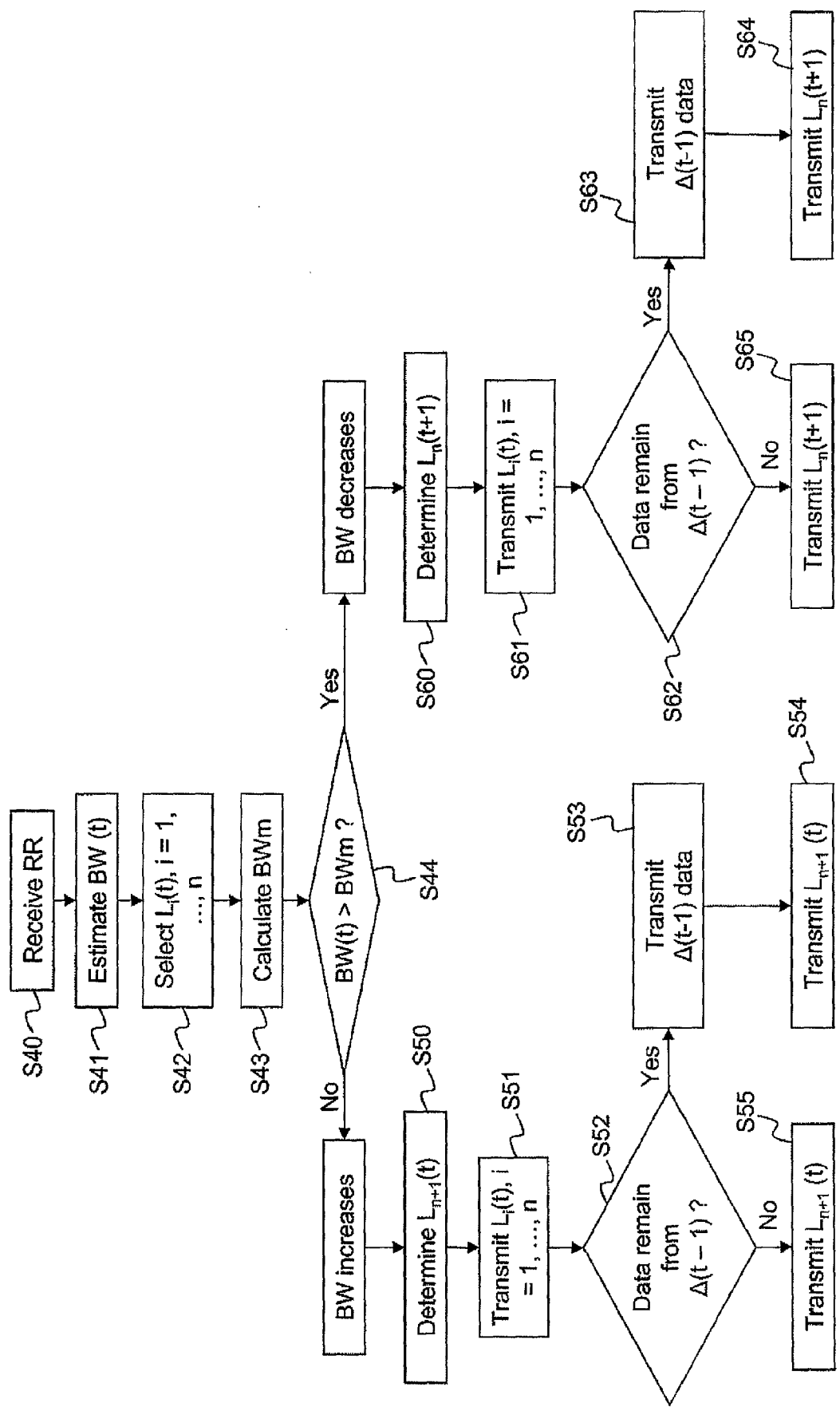
FIG. 4 is an algorithm illustrating the transmission method according to an embodiment of the present invention.

With reference to FIG. 4 a description will now be given of a transmission method in accordance with an embodiment of the invention making it possible to transmit additional data during the bandwidth residue illustrated in FIG. 3.

The bandwidth residue in fact corresponds to a rate which is not sufficient to enable the transmission of a hierarchical level directly above the last transmitted hierarchical level.

Thus, by way of purely illustrative example, during the first transmission period illustrated in FIG. 3, the hierarchical levels $L_0$ to $L_6$ are transmitted in the current bandwidth BW.

However, the bandwidth residue is not sufficient to enable the transmission of the hierarchical level $L_7$ directly above.

In its principle, the method of transmitting a video signal in accordance with the invention consists of anticipating the variations in bandwidth and of using that information in order to transmit the video signal with a set of hierarchical levels substantially constant over time, depending on the average bandwidth available on the communication network.

In order to make the estimation of the bandwidth available on the communication network, the transmission method first of all comprises a step S40 of receiving a Receiver Report or RR sent by a client of the communication network.

This report contains the information necessary for estimating the bandwidth available on the communication network at a given time.

An estimation step S41 is next performed for each evaluation period of the bandwidth.

This estimation may be carried out in known manner by means of a TFRC algorithm (TFRC being an acronym for "TCP Friendly Rate Control")

This algorithm is described in particular in the paper entitled "Equation-based congestion control for unicast applications" Sally Floyd, Mark Handley, Jitendra Padhye and Joerg Widmer, August 2000, SIGCOMM 2000.

As a variable representing the bandwidth the RTT (acronym for "Round Trip Time") may also be used, which corresponds to the time necessary to send a packet of data to a receiver and return it to the sender over a communication network.

For each evaluation period $\Delta(t)$, a bandwidth $BW(t)$ is estimated.

As stated earlier, the evaluation period $\Delta(t)$ may have a duration of between 30 and 300 ms.

For each current evaluation period, it is possible to estimate a set of hierarchical levels $L_i(t)$, i=1, ..., n, of which the transmission rate of the data for those hierarchical levels is compatible with the estimated bandwidth $BW(t)$ for the current evaluation period $\Delta(t)$.

In order to optimize the transfer of the video data by using the available bandwidth $BW(t)$, this set of hierarchical levels is selected such that the transmission of the data is optimum in view of the available bandwidth $BW(t)$.

In other words, here the hierarchical level $L_n(t)$ corresponds to the highest hierarchical level in the hierarchical coding that can be entirely transmitted, it not being possible to entirely transmit the hierarchical level $L_{n+1}(t)$ that is directly above in the available bandwidth $BW(t)$.

Thus, the selection of a set of hierarchical levels is such that the transmission rate of the data of those selected hierarchical levels is the closest possible to the current bandwidth $BW(t)$.

In order to use the bandwidth residue corresponding to the difference between the current bandwidth $BW(t)$ and the rate of transmission of the data of the selected hierarchical levels $L_i(t)$, i=1, ..., n, the transmission method implements a step of estimating the change tendency of the bandwidth for a following evaluation period, that is to say at the time t+1.

It will be noted that it is relatively difficult to precisely predict the future change in the transmission conditions over a communication network.

However, in the context of the present invention, it is not a matter of obtaining a very precise estimation of the future bandwidth but rather of estimating a change tendency of the bandwidth in order to avoid variations in the quality of transmitted data that are too great.

A relatively simple and reliable manner to obtain an indication as to the change tendency of the bandwidth consists of observing the past behavior of the bandwidth, in order to predict a change tendency in the future, and in particular at the following evaluation period $\Delta(t+1)$.

A relatively simple manner of evaluating the change tendency of the bandwidth is to compare the bandwidth estimated at the current evaluation period with an average value of the bandwidth over time.

Here a step S43 of calculating the average value BWm of the bandwidth is implemented. This average value is calculated for bandwidths estimated for preceding evaluation periods.

A comparing step S44 is then implemented to compare the value of the bandwidth estimated during the current evaluation period $BW(t)$ with the average value BWm calculated for the bandwidth in the past.

If the estimated current bandwidth $BW(t)$ is less than the average value BWm of the bandwidths, it is considered that the bandwidth BW is tending to increase for a following evaluation period $\Delta(t+1)$.

On the contrary, if the estimated current bandwidth $BW(t)$ is greater than the average value BWm of the bandwidths, it is considered that the bandwidth BW is tending to decrease for a following evaluation period $\Delta(t+1)$.

In other words, if the current bandwidth $BW(t)$ is less than the average value BWm, it is considered in reality that the current bandwidth is accidentally low and that, consequently, it should increase in the future.

On the contrary, if the current bandwidth is greater than the average value BWm, it is estimated that the current bandwidth $BW(t)$ is accidentally high and that, consequently, the bandwidth should decrease in the following evaluation period.

It will be noted that in order to improve the reactivity of the system and to adapt the evaluation of the bandwidth to the real conditions, the simple average BWm calculated of the bandwidths estimated over a certain number of prior evaluation periods, could be replaced by a weighted average making it possible in particular to give greater importance to the bandwidths estimated more recently.

This weighted average thus makes it possible to take into account the variations in bandwidths of the communication network more realistically.

Depending on the expected change in the bandwidth during the following evaluation period, the additional data of the video signal to transmit are determined.

In its principle, the step S50, S60 of determining those additional data consists of deciding to transmit additional data which form a complement to the transmitted data of the current evaluation period, if those data cannot be entirely transmitted during that current evaluation period, or additional data of the following evaluation period, where those additional data are liable not to be entirely transmitted during the following evaluation period.

Thus, at this step S50 of determining additional data, if the bandwidth for the evaluation period is tending to increase (left branch of the algorithm of FIG. 4), the additional data are chosen in at least one hierarchical level $L_{n+1}(t)$ higher than the set of the selected hierarchical levels $L_i(t)$, i=1, ..., n, for the current evaluation period $\Delta(t)$ at time t.

The additional data of this higher hierarchical level $L_{n+1}(t)$ will furthermore be determined on the basis of the residual bandwidth such that the rate of the additional data to transmit belonging to that higher hierarchical level $L_{n+1}(t)$ $L_{n+1}(t)$ are compatible with the bandwidth residue of at the current evaluation period $\Delta(t)$.

As the bandwidth tends to increase, it is considered that the additional data of the higher hierarchical level $L_{n+1}(t)$ which would not be transmitted during the current evaluation period $\Delta(t)$ could be transmitted at the following evaluation period $\Delta(t+1)$ having a higher bandwidth.

It will however be noted that the value of the bandwidth residue is decisive for the rate of additional data able to be transmitted, but is not directly useful for determining the higher hierarchical level $L_{n+1}(t)$ to transmit when the rate associated with that higher hierarchical level is still greater than the bandwidth residue.

On the contrary, if the bandwidth BW decreases (left branch of the algorithm of FIG. 4), at the additional data determining step S60, the additional data are chosen from among at least one hierarchical level of the following evaluation period $\Delta(t+1)$, the hierarchical level being identical to a hierarchical level of the set of selected hierarchical levels $L_i(t)$ i=1, ..., n, for the current evaluation period $\Delta(t)$.

In this embodiment, the additional data are chosen from among the hierarchical level $L_n(t+1)$ corresponding to the highest hierarchical level of the set of selected hierarchical levels $L_i(t)$, i=1, ..., n, for the current period $\Delta(t)$.

This determination of the additional data thus makes it possible to anticipate the reduction in bandwidth of the following evaluation period $\Delta(t+1)$ by transmitting data of the hierarchical levels in advance which would be liable not to be able to be transmitted in the following evaluation period $\Delta(t+1)$ due to the drop in bandwidth.

It will furthermore be noted that depending on the bandwidth residue, several hierarchical levels of the following evaluation period $\Delta(t+1)$ may be selected to constitute additional data and use the available bandwidth residue to the maximum.

The bandwidth residue value for the current evaluation period $\Delta(t)$ is thus also taken into account when the bandwidth tends to decrease to determine the additional data of the hierarchical levels for the following evaluation period $\Delta(t+1)$.

Once those additional data have been determined, the steps S51 and S61 of transmitting the data of the selected hierarchical levels $L_i(t)$, i=1, ..., n, are implemented, as well as the steps S54, S55, S64, S65 of transmitting the additional data determined as stated earlier.

In practice, before transmitting the additional data, and after having sent the data of the set of selected hierarchical levels $L_i(t)$, i=1, ..., n, for the current evaluation period $\Delta(t)$, verification is made in a search step S52, S62 of whether there remains data not transmitted during an evaluation period $\Delta(t-1)$ preceding the current evaluation period $\Delta(t)$.

In practice, these non-transmitted data correspond to the additional data determined for the preceding evaluation period (or several preceding evaluation periods) belonging to a hierarchical level determined at the determining steps S50, S60, but which were not able to be transmitted in entirety given the bandwidth residue available during those preceding evaluation periods.

If there are remaining data, a transmitting step S53, S63 is implemented during the current bandwidth residue to transmit those data not transmitted at the preceding evaluation period, then the additional data determined for the current evaluation period $\Delta(t)$ are transmitted in a transmitting step S54, S64.

On the contrary, if at the end of the searching step S52, S62, there are no remaining data to transmit, a transmitting step S55, S65 enables direct transmission of the additional data determined at the determining step S50, S60 for the current evaluation period $\Delta(t)$.

Figure 5:
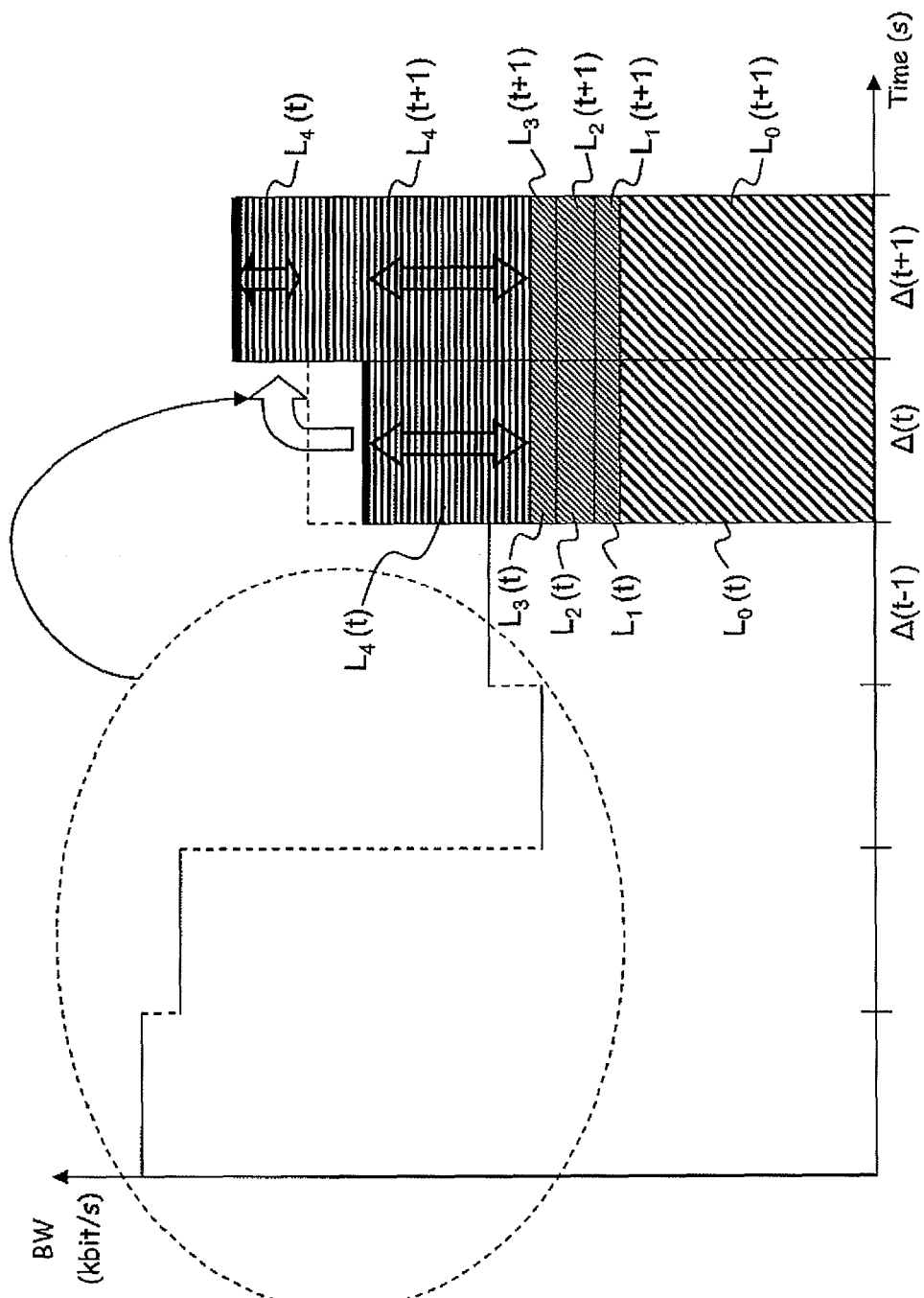
FIG. 5 is a diagrammatic illustration of the principle of the present invention when the bandwidth has a tendency to increase.
Figure 6:
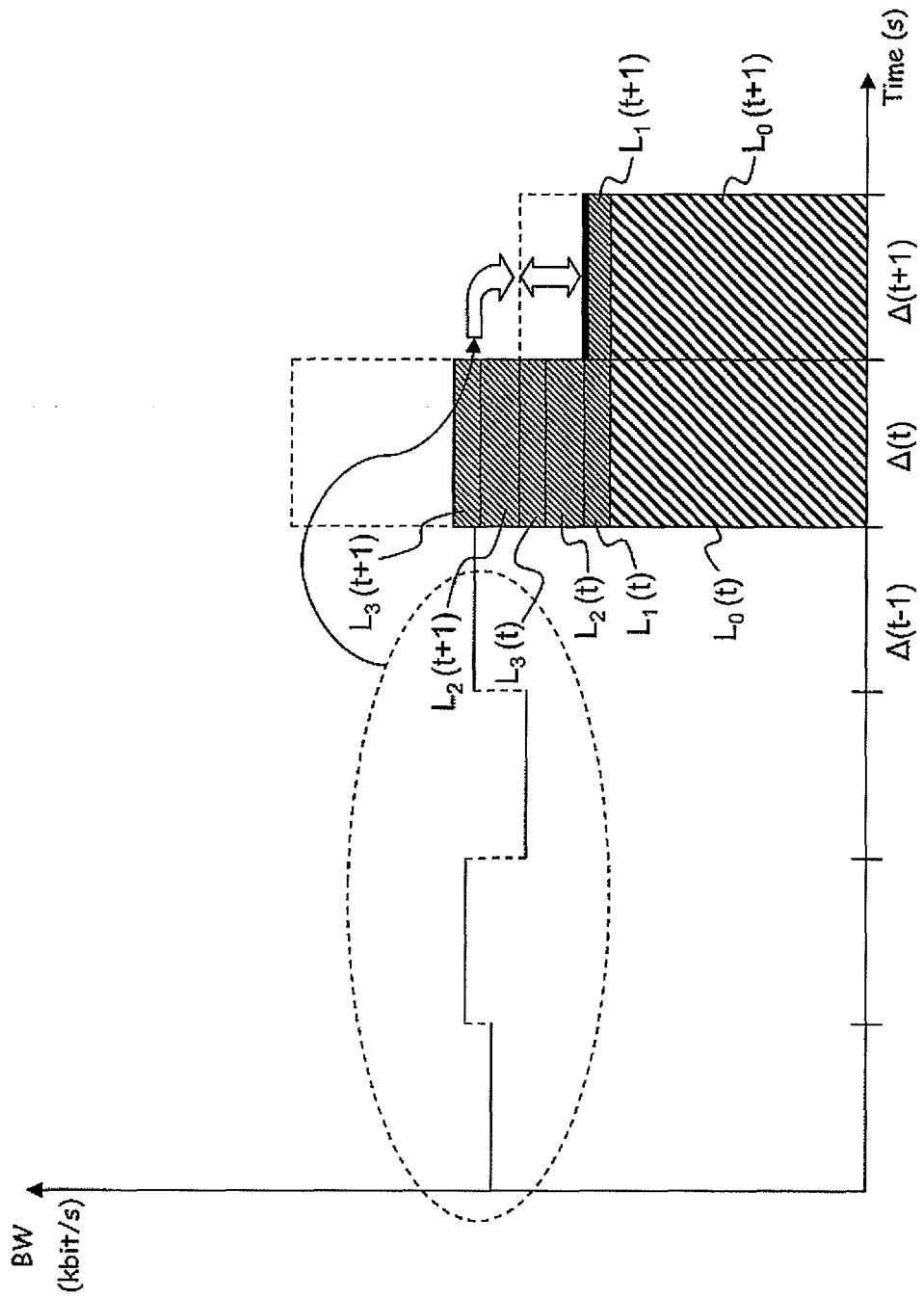
FIG. 6 is a diagram similar to FIG. 5 when the bandwidth has a tendency to decrease.

The implementation of this method is illustrated diagrammatically in FIGS. 5 and 6.

In FIG. 5, the particular case has been illustrated in which an increase in the bandwidth is expected in the following evaluation period $\Delta(t+1)$.

In this example, in the current evaluation period $\Delta(t)$, the optimum set $L_0(t)$ to $L_3(t)$ of the hierarchical levels able to be transmitted corresponds to the hierarchical levels which may be entirely transmitted in the current conditions BW(t) of the bandwidth.

On the contrary, the hierarchical level directly above $L_4(t)$ theoretically cannot be transmitted entirely during the current evaluation period $\Delta(t)$.

However, since an increase in the bandwidth is expected for the following evaluation period $\Delta(t+1)$, the transmission method according to the invention assumes that the data of that hierarchical level $L_4(t)$ which could not be transmitted during the current evaluation period $\Delta(t)$ will be able to be transmitted during the next evaluation period $\Delta(t+1)$.

Consequently, if no data of the preceding evaluation period $\Delta(t-1)$ remains to transmit, the transmission method provides for the transmission of the additional data of the hierarchical level $L_4(t)$ during the residue of available bandwidth in the current evaluation period $\Delta(t)$.

In the following evaluation period $\Delta(t+1)$, on account of the increase in bandwidth, the optimum set of the hierarchical levels able to be transmitted is constituted by the hierarchical levels $L_0(t+1)$ to $L_4(t+1)$.

Furthermore, according to the algorithm implemented, the data not transmitted in the preceding period $\Delta(t)$, that is to say the remaining data of the hierarchical level $L_4(t)$ which were not transmitted during the evaluation period $\Delta(t)$ will then be transmitted during the following evaluation period $\Delta(t+1)$.

In FIG. 6, an illustration has been given on the contrary of the opposite case in which a reduction in bandwidth is estimated for the following evaluation period $\Delta(t+1)$.

In this case, the optimum set of the hierarchical levels able to be transmitted entirely in the current bandwidth $\Delta(t)$ is constituted by the hierarchical levels $L_0(t)$ to $L_3(t)$.

It is then considered that the available bandwidth is abnormally high and that the best solution consists of ensuring good transmission of the lower hierarchical levels instead of attempting to transmit higher hierarchical levels in the current evaluation period $\Delta(t)$.

For this, the bandwidth residue is used to anticipate the reduction in bandwidth during the following evaluation period $\Delta(t+1)$.

As explained with reference to FIG. 4, the additional data are chosen in identical hierarchical levels to those transmitted in the current evaluation period $\Delta(t)$.

In this embodiment, the transmission method makes it possible, depending on the bandwidth residue, to transmit the additional data of the hierarchical levels $L_2(t+1)$ and $L_3(t+1)$ in advance.

At the following evaluation period $\Delta(t+1)$, due to the reduction in bandwidth, only the hierarchical levels $L_0(t+1)$ and $L_1(t+1)$ may be transmitted entirely in the available bandwidth BW(t+1).

It is thus found that the transmission method in accordance with the invention makes it possible not only to entirely use the available bandwidth for each evaluation period but also makes it possible to transmit the video signal with a coding quality level that is substantially constant over time, despite the variations in bandwidth for each evaluation period.

Thus, in addition to the advantage of using the entirety of the available bandwidth and avoiding competing applications using the bandwidth residue, the transmission method in accordance with the invention makes it possible to mitigate the effects of variations in bandwidth on the quality perceived at the time of the decoding of the video signal on reception.

It will be noted that this transmission method is particularly well-adapted to transmitting a pre-coded video signal in real-time between a server and a client of a communication network.

As stated previously, this transmission method fully finds its advantage for a signal coded according to the SVC standard with CGS hierarchical levels, of which the transmission has no value if those CGS hierarchical levels are not transmitted in entirety.

On reception of the transmitted data, the decoding device has a complementary routine to verify that the additional data transmitted in each evaluation period are not obsolete.

It is assumed here that the hierarchical levels are transmitted during the same RTP session, the data being transmitted in their order of decoding in RTP packets having successive sequence numbers.

Thus, when the decoder receives a data packet, the decoding method compares the sequence number of the last packet received and the sequence number of the packet containing the previously decoded image.

If the sequence number of the packet containing the previously decoded image is greater than the sequence number of the last packet received, it is thereby deduced that the image contained the last packet received is obsolete and that image is rejected.

Otherwise, that image is considered as valid and the decoder verifies whether the corresponding image can be decoded.

This step consists of verifying whether all the images necessary to decode a current image are available at the decoder end.

That image is then decoded, of course also using the data of the set of hierarchical levels selected for each evaluation period.

Figure 7:
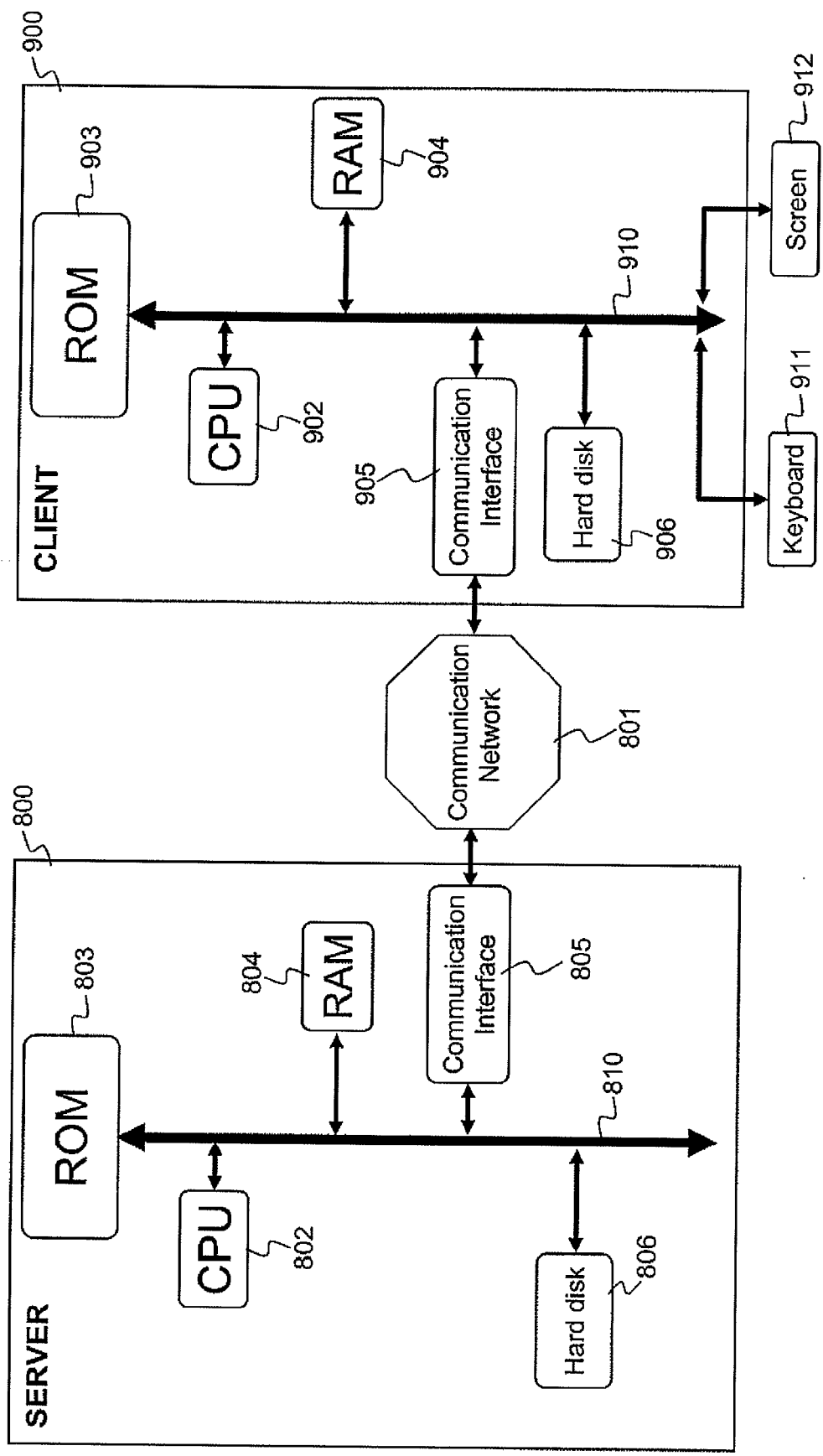
FIG. 7 is a block diagram illustrating a transmission device in accordance with the invention integrated into a server of a communication network.

In FIG. 7 there is illustrated a communication network 801 and a server 800 adapted to implement the transmission method in accordance with the invention to transmit a pre-coded video signal in real-time via the communication network 801 to a client 900.

The structure of the server 800 and of the client 900 is substantially identical and comprises among others a central processing unit 802, 902 (designated CPU in the drawing) which executes the instructions relative to the implementation of the invention. The instructions are stored in a read only memory 803, 903 or in other storage means. For example, the central processing unit carries out the steps illustrated in FIG. 4. On powering up, the programs which are stored in a non-volatile memory, for example the ROM 803, 903, are transferred into the random access memory RAM 804, 904, which will then contain the executable code of the invention as well as registers for storing the variables necessary for implementing the invention.

In a variant, the program or programs may be received in order to be stored in an identical fashion to that described previously via the communication network 801.

In more general terms, an information storage means, which can be read by a computer or microprocessor, integrated or not into the device, and which may possibly be partially or totally removable, stores a program implementing the data transmission method according to the invention.

The communication bus 810, 910 enables communication between the different elements included in the server 800 or the client 900. The representation of the bus 810, 910 is non-limiting and, in particular, the central processing unit 802, 902 may communicate instructions to any element of the server 800 or of the client 900, directly or by means of another element.

The server 800 and the client 900 further comprise a hard disk 806, 906, used by the central processing unit 802, 902 in a conventional manner via the bus 810, 910.

The server 800 and the client 900 further comprise a communication interface 805, 905 linked to the network 801 adapted to transmit digital data in the context of the implementation of the invention.

The server 800 thus integrates all the means of a device for transmitting a pre-coded video signal adapted to implement the transmission method described above.

In particular, that server incorporates means for periodically estimating, over evaluation periods, the bandwidth of the communication network and periods for estimating a change tendency of the that bandwidth for a following evaluation period.

Calculating means also make it possible to calculate the residue of current bandwidth on the basis of difference between the current bandwidth and the rate of transmission of the data of the selected hierarchical levels.

Selecting means make it possible, for each current evaluation period, to select a set of hierarchical levels of which the rate is compatible with the estimated bandwidth as well as additional data, as explained previously, depending on the change tendency of the bandwidth and of the residue of current bandwidth.

The server further comprises means for transmitting the data so selected via the communication interface 805 and the communication network 801 to the client 900.

These transmitting means are adapted to transmit the data of the set of the selected hierarchical levels as well as the data not transmitted during an evaluation period preceding the current evaluation period, and lastly the additional data determined on the basis of the change in the bandwidth.

The client also comprises a program for decoding a video signal adapted to be implemented by the processor 902.

This client device further comprises elements for interface with the user, and in particular a keyboard 911 as well as a screen 912 for viewing the video signal after transmission and decoding as indicated above.

It will be noted that the transmission method described above is entirely implemented on the server 800.

This server completely takes on the task of the method of video data transmission adaptation depending on the conditions sent by the client 800 over the communication network 801.

Of course, the present invention is not limited to the embodiments described above and numerous modifications may be made to those examples without departing from the scope of the invention.

The invention claimed is:

1. A transmission method for transmitting a video signal over a communication network, comprising the following steps:

pre-coding the video signal using hierarchical coding thereby obtaining pre-coded video signal, the pre-coded video signal being constituted by data distributed into a plurality of hierarchical levels;

periodically estimating a bandwidth of the communication network over evaluation periods;

selecting, for a current evaluation period, a set of hierarchical levels in the plurality of hierarchical levels constituting the pre-coded video signal, wherein a transmission rate of the data of the selected hierarchical levels is compatible with the bandwidth estimated for the current evaluation period;

estimating a change tendency of the bandwidth for a following evaluation period;

determining additional data of the video signal to transmit depending on the estimated change tendency of the bandwidth, wherein the additional data are chosen from among data of the current evaluation period or data of the following evaluation period, wherein if the bandwidth for the following evaluation period has a tendency to increase, the additional data are chosen in at least one hierarchical level higher than the set of hierarchical levels selected for the current evaluation period, and wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and transmitting the data of the selected hierarchical levels and the determined additional data during the current evaluation period.

2. A transmission method according to claim 1, wherein at the step of determining additional data, the additional data are determined furthermore on the basis of a bandwidth residue calculated on the basis of a difference between the current bandwidth and the transmission rate of the data of the selected hierarchical levels.

3. A transmission method according to claim 1, wherein the transmitting step comprises:
sending the data of the set of hierarchical levels selected for the current evaluation period;
searching for data not transmitted during an evaluation period preceding the current evaluation period; and
transmitting the data not transmitted at the preceding evaluation period, and then transmitting the determined additional data.

4. A transmission method according to claim 1, wherein at the step of estimating the change tendency, the change tendency is evaluated on the basis of bandwidths estimated for at least one preceding evaluation period prior to the current evaluation period.

5. A transmission method according to claim 4, wherein at the step of estimating the change tendency, the bandwidth estimated for the current evaluation period is compared with an average value of the bandwidths estimated for preceding evaluation periods, the bandwidth for a following evaluation period tending to increase when the estimated current bandwidth is less than the average value of the bandwidths, and the bandwidth for a following evaluation period tending to decrease when the estimated current bandwidth is greater than the average value of the bandwidths.

6. A transmission method according to claim 1, wherein at the step of selecting a set of hierarchical levels, the set is selected such that the transmission rate of the data of the selected hierarchical levels is the closest possible to the current bandwidth.

7. A transmission method according to claim 1, wherein the pre-coded video signal is transmitted in real-time between a server and a client of the communication network.

8. A transmission method according to claim 1, wherein the pre-coded video signal is a signal coded in accordance with the Scalable Video Coding (SVC) standard with Coarse Grain Scalability (CGS) hierarchical levels.

9. A transmission method according to claim 1, wherein the plurality of hierarchical levels are one of either Coarse Grain Scalability (CGS) or Medium Grain Scalability (MGS) hierarchical levels.

10. A non-transitory computer-readable storage medium storing a computer program that can be loaded into a computer system, the program comprising instructions enabling the implementation of the transmission method according to claim 1, when that program is loaded and executed by a computer system.

11. A transmission device for transmitting a video signal over a communication network, comprising:
a pre-coding unit configured to pre-code the video signal using hierarchical coding thereby obtaining a pre-coded video signal, the pre-coded video signal being constituted by data distributed into a plurality of hierarchical levels;
an periodic estimating unit configured to periodically estimate a bandwidth of the communication network over evaluation periods;
a selecting unit configured to select, for a current evaluation period, a set of hierarchical levels in the plurality of hierarchical levels constituting the pre-coded video signal, wherein a transmission rate of the data of the selected hierarchical levels is compatible with the bandwidth estimated for the current evaluation period;
an estimating unit configured to estimate a change tendency of the bandwidth for a following evaluation period;
a determining unit configured to determine additional data of the video signal to transmit depending on the estimated change tendency of the bandwidth,
wherein the additional data are chosen from among data of the current evaluation period or data of the following evaluation period,
wherein if the bandwidth for the following evaluation period has a tendency to increase, the additional data are chosen in at least one hierarchical level higher than the set of hierarchical levels selected for the current evaluation period, and
wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and
a transmitting unit configured to transmit the data of the selected hierarchical levels and the determined additional data during the current evaluation period.

12. A transmission device according to claim 11, wherein the transmitting unit comprises:
a sending unit configured to send said data of the set of hierarchical levels selected for the current evaluation period; and
a search unit configured to search for data not transmitted during an evaluation period preceding the current evaluation period,
wherein the transmitting unit transmits data not transmitted at the preceding evaluation period, and then transmits determined additional data.

13. A transmission device according to one of claim 11 or 12, comprising:
a calculating unit configured to calculate a residue of current bandwidth on the basis of difference between the current bandwidth and the rate of transmission of the data of the selected hierarchical levels.

14. A server of a communication network adapted to transmit a video signal pre-coded using hierarchical coding, comprising means for implementing the transmission method according to claim 1.

15. A server according to claim 14, wherein the pre-coded video signal is transmitted in real-time between the server and a client of the communication network.

16. A server according to one of claim 14 or 15, wherein the pre-coded video signal is a signal coded in accordance with the Scalable Video Coding (SVC) standard with Coarse Grain Scalability (CGS) hierarchical levels.

17. A transmission device according to claim 11, wherein the plurality of hierarchical levels are one of either Coarse Grain Scalability (CGS) or Medium Grain Scalability (MGS) hierarchical levels.

18. A transmission method for transmitting a video signal over a communication network, comprising the following steps:
pre-coding the video signal using hierarchical coding thereby obtaining a pre-coded video signal, the pre-coded video signal being constituted by data distributed into a plurality of hierarchical levels;
periodically estimating a bandwidth of the communication network over evaluation periods;
selecting, for a current evaluation period, a set of hierarchical levels, wherein a transmission rate of the data of said selected hierarchical levels is compatible with the bandwidth estimated for the current evaluation period;
estimating, before transmitting data during the current evaluation period, a change tendency of the bandwidth for a following evaluation period;
determining additional data of the video signal to transmit depending on the estimated change tendency of the bandwidth for the following evaluation period,
wherein the additional data are chosen from among data of the current evaluation period or data of the following evaluation period,
wherein if the bandwidth for the following evaluation period has a tendency to increase, the additional data are chosen in at least one hierarchical level higher than the set of hierarchical levels selected for the current evaluation period, and
wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and
transmitting the data of the selected hierarchical levels and the determined additional data during the current evaluation period.

19. A transmission device for transmitting a video signal over a communication network, comprising:
a pre-coding unit configured to pre-code the video signal using hierarchical coding thereby obtaining a pre-coded video signal, the pre-coded video signal being constituted by data distributed into a plurality of hierarchical levels;
a periodic estimating unit configured to periodically estimate a bandwidth of the communication network over evaluation periods;
a selecting unit configured to select, for a current evaluation period, a set of hierarchical levels, wherein a transmission rate of the data of the selected hierarchical levels is compatible with the bandwidth estimated for the current evaluation period;
an estimating unit configured to estimate, before transmitting data during the current evaluation period, a change tendency of the bandwidth for a following evaluation period;
a determining unit configured to determine additional data of the video signal to transmit depending on the estimated change tendency of the bandwidth for the following evaluation period,
wherein the additional data are chosen from among data of the current evaluation period or data of the following evaluation period,
wherein if the bandwidth for the following evaluation period has a tendency to increase, the additional data are chosen in at least one hierarchical level higher than the set of hierarchical levels selected for the current evaluation period, and
wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and
a transmitting unit configured to transmit the data of the selected hierarchical levels and the determined additional data during the current evaluation period.

20. A transmission method for transmitting a video signal over a communication network, comprising the following steps:
pre-coding the video signal using hierarchical coding thereby obtaining a pre-coded video signal, the pre-coded video signal being constituted by data distributed into a plurality of hierarchical levels;
periodically estimating a bandwidth of the communication network over evaluation periods;
selecting, for a current evaluation period for evaluating a bandwidth available on the communication network, a set of hierarchical levels, wherein a transmission rate of the data of the selected hierarchical levels is compatible with the bandwidth estimated for the current evaluation period;
estimating a change tendency of the bandwidth for a future following evaluation period for evaluating a bandwidth available on the communication network that will follow the current evaluation period;
determining additional data of the video signal to transmit depending on the estimated change tendency of the bandwidth,
wherein the additional data are chosen from among data of the current evaluation period or data of the following evaluation period,
wherein if the bandwidth for the following evaluation period has a tendency to increase, the additional data are chosen in at least one hierarchical level higher than the set of hierarchical levels selected for the current evaluation period, and
wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and
transmitting the data of the selected hierarchical levels and the determined additional data during the current evaluation period.

21. A transmission device for transmitting a video signal over a communication network, comprising:
a pre-coding unit configured to pre-code the video signal using hierarchical coding thereby obtaining a pre-coded video signal, the pre-coded video signal being constituted by data distributed into a plurality of hierarchical levels;
a periodic estimating unit configured to periodically estimate a bandwidth of the communication network over evaluation periods;
a selecting unit configured to select, for a current evaluation period for evaluating a bandwidth available on the communication network, a set of hierarchical levels, wherein a transmission rate of the data of the selected hierarchical levels is compatible with the bandwidth estimated for the current evaluation period;

an estimating unit configured to estimate a change tendency of the bandwidth for a future following evaluation period for evaluating a bandwidth available on the communication network that will follow the current evaluation period;

a determining unit configured to determine additional data of the video signal to transmit depending on the estimated change tendency of the bandwidth, wherein the additional data are chosen from among data of the current evaluation period or data of the following evaluation period, wherein if the bandwidth for the following evaluation period has a tendency to increase, the additional data are chosen in at least one hierarchical level higher than the set of hierarchical levels selected for the current evaluation period, and wherein if the bandwidth for the following evaluation period has a tendency to decrease, the additional data are chosen from among at least one hierarchical level of the following evaluation period, wherein the hierarchical level is identical to a hierarchical level of the set of hierarchical levels selected for the current evaluation period; and a transmitting unit configured to transmit the data of the selected hierarchical levels and the determined additional data during the current evaluation period.

* * * * *